(12) United States Patent
Ladouceur (10) Patent No.: US 10,864,486 B2
(45) Date of Patent: Dec. 15, 2020

(54) ROTARY GAS BUBBLE EJECTOR

(71) Applicant: Richard Ladouceur, Hornby Island (CA)

(72) Inventor: Richard Ladouceur, Hornby Island (CA)

( * ) Notice: Subject to any disclaimer, the term of this patent is extended or adjusted under 35 U.S.C. 154(b) by 297 days.

(21) Appl. No.: 16/071,238

(22) PCT Filed: Jan. 18, 2017

(86) PCT No.: PCT/CA2017/050054
§ 371 (c)(1),
(2) Date: Jul. 19, 2018

(87) PCT Pub. No.: WO2017/127918
PCT Pub. Date: Aug. 3, 2017

(65) Prior Publication Data
US 2019/0201855 A1 Jul. 4, 2019

(30) Foreign Application Priority Data

Jan. 29, 2016 (CA) ...................................... 2919280

(51) Int. Cl.
| | | |
|---|---|---|
| *B01F 3/04* | (2006.01) | |
| *B01F 7/00* | (2006.01) | |
| *B01F 7/26* | (2006.01) | |

(52) U.S. Cl.
CPC ........ *B01F 3/04531* (2013.01); *B01F 7/0045* (2013.01); *B01F 7/00633* (2013.01);
(Continued)

(58) Field of Classification Search
CPC ................ B01F 3/04531; B01F 7/0045; B01F 7/00633; B01F 7/00733; B01F 7/26;
(Continued)

(56) References Cited

U.S. PATENT DOCUMENTS

| | | | | |
|---|---|---|---|---|
| 880,506 | A | * | 3/1908 | Clawson |
| 1,110,914 | A | * | 9/1914 | Feld .................... B01F 3/04773 |
| | | | | 261/91 |

(Continued)

FOREIGN PATENT DOCUMENTS

| | | |
|---|---|---|
| CA | 2 561 426 A1 | 10/2005 |
| CA | 2 809 366 A1 | 3/2012 |

(Continued)

OTHER PUBLICATIONS

International Search Report Corresponding to PCT/CA2017/050054 dated Apr. 5, 2017.

(Continued)

*Primary Examiner* — Charles S Bushey
(74) *Attorney, Agent, or Firm* — Davis & Bujold PLLC; Michael J. Bujold (57) ABSTRACT

A rotary gas bubble ejector has a fluid reservoir chamber having at a bottom end a fluid discharge opening and a shaft extending through fluid reservoir chamber in connection with a rotor plate. The rotor plate has an outer dimension greater than the outer dimension of fluid discharge opening and is positioned proximate bottom end of fluid reservoir chamber such that a fluid acceleration gap is formed. Rotation of the shaft and rotor plate initiates a fluid flow thereby generating a low-pressure zone within the fluid acceleration gap, wherein gas is discharged from the fluid reservoir chamber into the fluid acceleration gap. As the gas is expelled from the fluid acceleration gap, fluids, gas and liquid, are brought into contact producing micro-sized gas bubbles that are ejected into the body of liquid.

11 Claims, 5 Drawing Sheets

(52) U.S. Cl.
CPC ............ *B01F 7/00733* (2013.01); *B01F 7/26* (2013.01); *B01F 2003/0468* (2013.01); *B01F 2003/04645* (2013.01); *B01F 2003/04872* (2013.01); *B01F 2215/0052* (2013.01)

(58) Field of Classification Search
CPC .... B01F 2003/04645; B01F 2003/0468; B01F 2003/04872; B01F 2215/0052
USPC ...................................................... 261/91, 93
See application file for complete search history.

(56) References Cited

U.S. PATENT DOCUMENTS

| | | | | |
|---|---|---|---|---|
| 3,823,923 | A * | 7/1974 | Chapsal | .................. C02F 3/205 |
| | | | | 261/93 |
| 4,265,739 | A * | 5/1981 | Dalton | ................ B01F 3/04539 |
| | | | | 209/169 |
| 4,313,898 | A * | 2/1982 | Schurch | .............. B01F 3/04539 |
| | | | | 261/93 |
| 4,643,852 | A * | 2/1987 | Koslow | ............... B01F 3/04539 |
| | | | | 209/170 |
| 5,643,503 | A | 7/1997 | Roland | |
| 6,461,500 | B1 * | 10/2002 | Hoage | .................. B01F 3/04262 |
| | | | | 210/150 |
| 6,736,377 | B1 * | 5/2004 | Chien | .................. B01F 3/04595 |
| | | | | 210/221.2 |
| 7,306,722 | B1 * | 12/2007 | Hoage | .................. B01F 3/04609 |
| | | | | 210/220 |
| 7,651,075 | B2 * | 1/2010 | Rho | .................... B01F 3/04609 |
| | | | | 261/91 |
| 8,172,206 | B2 * | 5/2012 | St. Lawrence | ...... B01F 3/04609 |
| | | | | 261/93 |
| 8,297,599 | B2 | 10/2012 | Tanaka et al. | |
| 8,851,457 | B2 | 10/2014 | Ladouceur | |
| 2008/0251427 | A1 * | 10/2008 | Mankosa | ............ B03D 1/1487 |
| | | | | 209/164 |
| 2009/0001188 | A1 | 1/2009 | Hassan et al. | |
| 2011/0101547 | A1 * | 5/2011 | Nguyen | ............. B01F 3/04617 |
| | | | | 261/93 |
| 2014/0197555 | A1 | 7/2014 | Jacobs | |

FOREIGN PATENT DOCUMENTS

| | | |
|---|---|---|
| CN | 104230017 A | 12/2014 |
| CN | 105432548 A | 3/2016 |
| WO | 2010/105352 A1 | 9/2010 |

OTHER PUBLICATIONS

Written Opinion Corresponding to PCT/CA2017/050054 dated Apr. 5, 2017.

* cited by examiner

ROTARY GAS BUBBLE EJECTOR

This application is a National Stage completion of PCT/CA2017/050054 filed Jan. 18, 2017, which claims priority from Canadian patent application serial no. 2,919,280 filed Jan. 29, 2016.

FIELD

The present disclosure relates to a rotary gas bubble ejector that can provide for dissolved oxygen requirements within a body of liquid such as wastewater or other aquatic environments for the purpose of supporting aerobic biotic activities.

BACKGROUND

There exist today a plenitude of devices that are designed to introduce oxygen typically from the atmosphere via gas bubbles into a body of liquid (water or wastewater), which is referred to as aeration.

The two principle types of processes employed for aeration are forced air subsurface low-pressure aeration and mechanical aeration.

Subsurface low-pressure aeration employs a blower or compressor to deliver gas to some form of porous or perforated air transferring device located near the bottom of a reactor tank or at a specified depth within a body of liquid. This process of aeration is commonly employed within wastewater treatment and provides a high rate of mixing in order to keep particulate matter in suspension and requires a specified submergence depth to perform properly.

Mechanical aeration incorporates a motor that is connected to some form of rotating device. Once the device is in rotation it can either move liquid out into contact with the air as a fine spray or direct air into the liquid to be mixed with the liquid. There are a number of variants that provide for the later.

One variant in common use is the self-aspirating type mechanical aerator. This mode of aeration introduces atmospheric air into contact with liquid by generating a slight vacuum or low-pressure zone via a unidirectional flow of high velocity liquid either through a rotating propeller, disc or impeller that incorporates deflective extensions that force liquid to flow through, around or over the extensions thereby increasing liquid flow velocity for the formation of the low-pressure zone.

The above mentioned aeration processes produce a large percentage of gas bubbles within the range of 1 to 2 millimetres and are large energy consumers, which is not only related to electrical consumption but also the full life cycle energy demands such as: manufacturing cost, operational needs, maintenance requirements and replacement cost. One parameter that is assigned to aeration devices is called 'Standard Aeration Efficiency' which is the energy (kilowatts or horsepower) required to transfer a volume of oxygen over a specified time (most typically per hour) under standard conditions.

The current interest in reducing operating, maintenance and overall energy cost is driving a concerted effort to develop and improve aeration devices that can support better aeration efficiency as well as lower the life cycle cost associated with various aeration processes.

A number of related prior art devices are listed below;

U.S. Pat. No. 5,643,503 July 1997, Jean-Louis Roland discloses a device for introducing a gas into a liquid that includes a drive motor, a wind box, a gas intake pipe and a radial diffusion turbine coupled to an agitator turbine. In operation gas is conveyed to the center of the gas diffusion turbine and distributed through vanes positioned between the two turbines.

U.S. Pat. No. 6,297,599, October 2012, Hiroyuki Tanaka and Satoshi Matsumoto disclose a submersible aerator having an impeller that includes blades having partition walls which separate liquid passages and air passages, which is accommodated with a guide casing for rotation between lower surface of an intermediate plate having an air opening and an upper surface of a cover having a liquid suction opening. In operation the motor rotates the impeller, which sucks in separately the liquid and air that are mixed and jetted out through air-liquid mixing discharge passages.

U.S. Pat. No. 8,851,457, October 2014, Richard Ladouceur discloses an aeration method comprising of a gas liquid mixture chamber incorporating an impeller affixed to a rotatable shaft, a gas intake opening and a gas-liquid discharge opening positioned at a bottom end of gas-liquid mixture chamber. In operation rotation of the impeller creates a low-pressure zone allowing gas to enter into gas liquid mixture chamber wherein gas bubbles are formed and confined briefly prior to discharge from bottom end of gas liquid mixture chamber.

China patent CN105432548A. March 2016, discloses a submersible turbine aerator having a submersible motor attached to the bottom side of an impeller that is housed within a surrounding housing having openings around the perimeter and incorporating an air intake positioned at the upper end of the impeller housing. In operation the rotating housed impeller draws air into the impeller. The air is directed radially via the impeller and leaves at the perimeter of the housing where the air comes into contact with liquid.

Patent application US2014019755, Jan. 15, 2014, John L Jacobs discloses a 'Method and apparatus for treatment and purification of liquid through aeration', with an aerator having an orifice plate and a rotor disk attached to a rotating shaft and positioned within a decompression chamber having an air intake. In operation rotation of orifice plate and rotor disk allows air to enter into the decompression chamber and mix with the liquid forming micro bubbles.

SUMMARY

There is described a rotary gas bubble ejector with a fluid reservoir chamber having a volume defined by a sidewall, an upper end and a bottom end. The fluid reservoir chamber has a fluid discharge opening positioned at the bottom end and a fluid intake opening. At least one rotor plate is provided that has a cross-sectional dimension greater than the fluid discharge opening. The at least one rotor plate has an upper surface positioned below and proximate to the bottom end of the fluid reservoir chamber. A fluid acceleration gap is positioned between the bottom end of the fluid reservoir chamber and the upper surface of the at least one rotor plate. A shaft extends through the fluid reservoir chamber and is connected to the at least one rotor plate. Upon rotation of the shaft, a fluid flow is initiated by the at least one rotor plate, thereby producing a low-pressure zone within the fluid acceleration gap.

In operational mode the rotary gas bubble ejector will include the addition of a fluid conveyance conduit that is in fluid communication with the fluid intake opening of the fluid reservoir chamber and a rotational drive that provides rotation of the shaft. The rotary gas bubble ejector is then submerged within a body of liquid wherein the shaft in connection with at least one rotor plate are brought into rotation. Rotation at start up generates a fluid flow that causes the liquid to be evacuated out from within the partially submerged fluid conveyance conduit and the fully submerged fluid reservoir chamber via the fluid discharge opening and replaced with gas. The gas flow acceleration rate within the fluid conveyance conduit is reduced as it enters the fluid reservoir chamber, due to the larger volumetric area of the fluid reservoir chamber, thereby increasing the gas pressure within the fluid reservoir chamber. Gas exits from the fluid reservoir chamber via the fluid discharge opening and enters the fluid acceleration gap between the rotor plate and the bottom end of fluid reservoir chamber, wherein the gas flow acceleration rate is increased thereby forming a low-pressure zone. As the gas is expelled from the fluid acceleration gap it comes into contact with the liquid wherein micro-sized gas bubbles are generated and ejected into the body of liquid.

The rotor plate is the element that provides the force that is exerted upon the fluids, gas and liquid, and can be designed with solid surfaces or to include grooves, openings, tabs as well as assembled in combination as multiple rotor plates. Each variant allows for adaptive options based upon the specificity of various applications along with the function of producing micro-size gas bubbles that enable the transfer of oxygen into a body of liquid and the capacity to improve aeration efficiency.

Test have shown that the use of at least one solid rotor plate provides micro-sized gas bubble formation that imparts the least output momentum and the least current draw potential. The solid rotor plate variant can have beneficial use in applications such as aquaculture, bioreactors, and low depth bodies of liquid or when minimum particulate matter disturbance is required.

The force exerted upon the fluids of the solid rotor plate variant can be increased with the introduction of grooves and or openings and tabs. These variants increase output momentum imparted onto the fluids as they are expelled into the body of liquid. The greater momentum translates into greater shear and more fluid mixing potential.

Additional fluid flow dynamics can be introduced with the addition of multiple rotor plates having grooves, openings and or openings incorporating tabs that can be flat or bent at an angle away from the rotor plate surface either upward or downward as well as in combination. A tab angle from 5 up to 15 degrees has shown good energy efficiencies with respect to motor current draw and provides a higher rate of fluid mixing. The spacing distance between the multiple rotor plates will affect the fluids flow through volume and can be adjusted with a rotor plate spacer or other such means. The multiple rotor plate variant provides for high fluid shear, fluidic oscillation, the formation of vortices and produces a greater volumetric ratio of micro-sized gas bubble within the range of 0.2 millimeters and smaller. One benefit of the multiple rotor plate variant is an increase oxygen transfer within a shorter time frame, which can improve efficiencies within the application of wastewater treatment where high oxygen transfer is required to support aerobic microbiological growth processes.

BRIEF DESCRIPTION OF DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
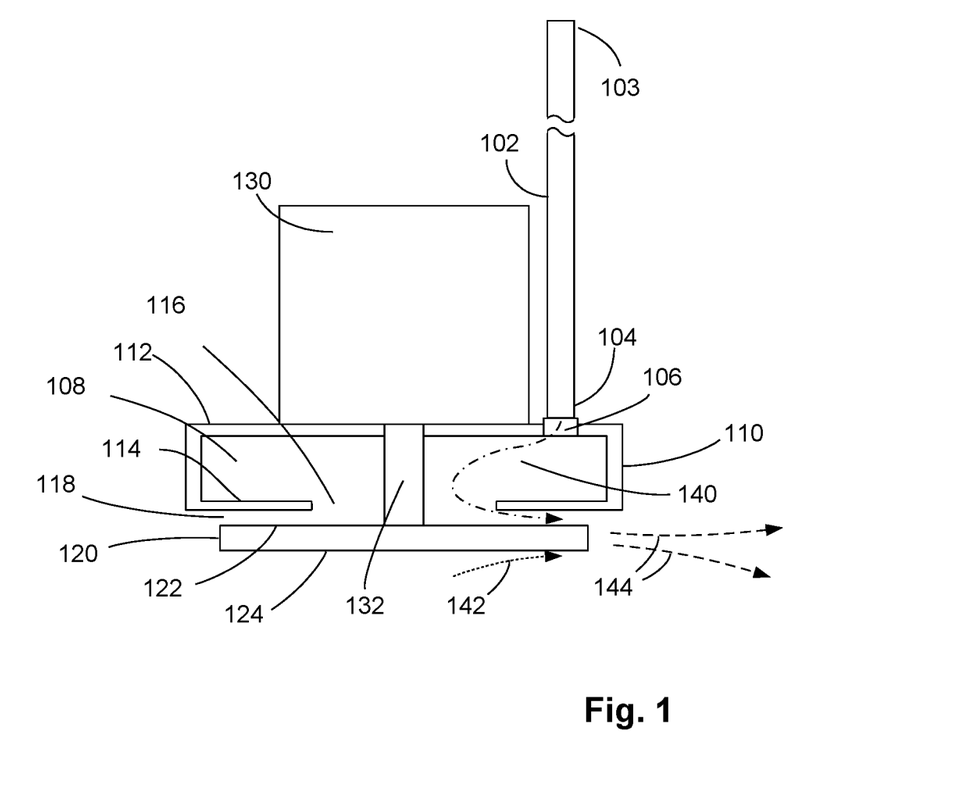
FIG. 1 is a sectional view of the basic embodiment of the rotary gas bubble ejector assembly in operational mode with a rotational drive and a fluid conveyance conduit attached to a fluid reservoir chamber with a shaft that extends through and connected to a rotor plate.

FIG. 1 illustrates the basic elements of the rotary gas bubble ejector assembly, which incorporates a fluid intake opening 106, a fluid reservoir chamber 108, a centrally placed fluid discharge opening 116, a rotor plate 120, a rotational drive 130 and a shaft 132.

Fluid reservoir chamber 108 has a volume defined by a sidewall 110 in connection with an upper end 112 and a bottom end 114 that includes a centrally positioned fluid discharge opening 116. The positioning of rotor plate 120 relative to fluid discharge opening 116 creates a fluid acceleration gap 118, as will hereinafter be further described.

A fluid conveyance conduit 102 supplies gas to fluid reservoir chamber 108. Fluid conveyance conduit has an inlet section 103 positioned at or near an upper end in communication with a gas source, such as atmospheric gas and an outlet section 104 in connection with fluid intake opening 106 positioned at upper end 112 such that outlet section 104 is in fluid communication with fluid reservoir chamber 108. The positioning of fluid intake opening 106 is non-specific and therefore can be placed at sidewall 110 or at bottom end 114. The preferred placement is, as illustrated, at the upper end 112.

Rotor plate 120 includes an upper surface 122 and a lower surface 124 wherein the outer cross-sectional dimension of the rotor plate 120 is greater than the outer cross sectional dimension of the fluid discharge opening 116. As part of this illustrated embodiment the bottom end 114 extends beyond the outer cross sectional dimension of rotor plate 120, which can provide for greater radially directed fluid flow as gas 140 is expelled from fluid acceleration gap 118.

In a preferred embodiment the bottom end 114 of fluid reservoir chamber 108 has an outer dimension that is proximate to or greater than the outer dimension of the rotor plate 120. Having the rotor plate extend to any great distance past the bottom end 114 will increase the current draw of the rotational drive 130 thereby reducing some efficiencies. This is a result of the rotor plate 120 having a greater surface area under the influence of the liquid 142 requiring a greater torque to be applied for rotation. When the bulk of the rotor plate 120 cross-sectional dimension is positioned below the bottom end 11 it resides predominantly within an environment of gas 140 that is flowing through the fluid acceleration gap 118 such that the rotor plate 120 is subject to less of a resistance force. The reason for this difference in resistance force is that gas is less viscous than liquid.

The upper surface 122 of rotor plate 120 is positioned below and in close proximity to bottom end 114 so as to form a fluid acceleration gap 118. The preferred fluid acceleration gap 118 spacing for most applications is around 6.35 millimetres (0.25 inch).

Rotational drive 130, which in this embodiment is that of a fully submersed type, is attached at upper end 112 of fluid reservoir chamber 108, and provides for the rotation of shaft 132 that extends through upper end 112 continuing through fluid reservoir chamber 108 and is in connection with rotor plate 120.

In operation mode the activation of submerged rotational drive 130 generates rotation of shaft 132 and of rotor plate 120. Rotation will initiate, at an initial start-up, fluid flow of liquid that is evacuated out from within the partially submerged fluid conveyance conduit 102 and the fully submerged fluid reservoir chamber 108 and displaced with gas that enters via inlet section 103 and exits from outlet section 104 into fluid reservoir chamber 108. Since the fluid reservoir chamber 108 is fully submerged it is preferred that any elements in attachment with it be sealed so as to prevent infiltration of liquid after liquid has been displaced with gas. Although the rotary gas bubble ejector is still operational with liquid infiltration the efficiency will be reduced.

The variation in cross sectional area between the fluid conveyance conduit 102 and the fluid reservoir chamber 108 develops different gas flow acceleration rates, which allows a slight increase in gas pressure to develop within the fluid reservoir chamber 108 as the acceleration rate of gas exiting the fluid conveyance conduit 102 becomes reduced due to the increase in the volumetric area of the fluid reservoir chamber 108. The increase pressure provides a positive outflow of gas 140 through the fluid discharge opening 116 into the low-pressure zone generated within fluid acceleration gap 118 via rotation of rotor plate 120 Gas bubbles 144 are formed when the fluids, gas 140 and liquid 142, are expelled from fluid acceleration gap 118 and brought into contact with each other.

The basic embodiment of the rotary gas bubble ejector as described and illustrated in FIG. 1 is equipped with, but not limited to, a rotor plate 120 that includes a solid upper surface 122 and solid lower surface 124. This variant of the rotor plate 120 can provide for the production of micro-sized gas bubbles that are ejected with the least fluid momentum and can be used in applications such as aquaculture, shallow depth water bodies and applications requiring minimum particulate mixing.

Rotation of rotor plate 120 is not limited to only one direction and can be rotated either clockwise or counterclockwise also the position of the rotary gas bubble ejector is not limited to being predominantly horizontal.

Figure 2:
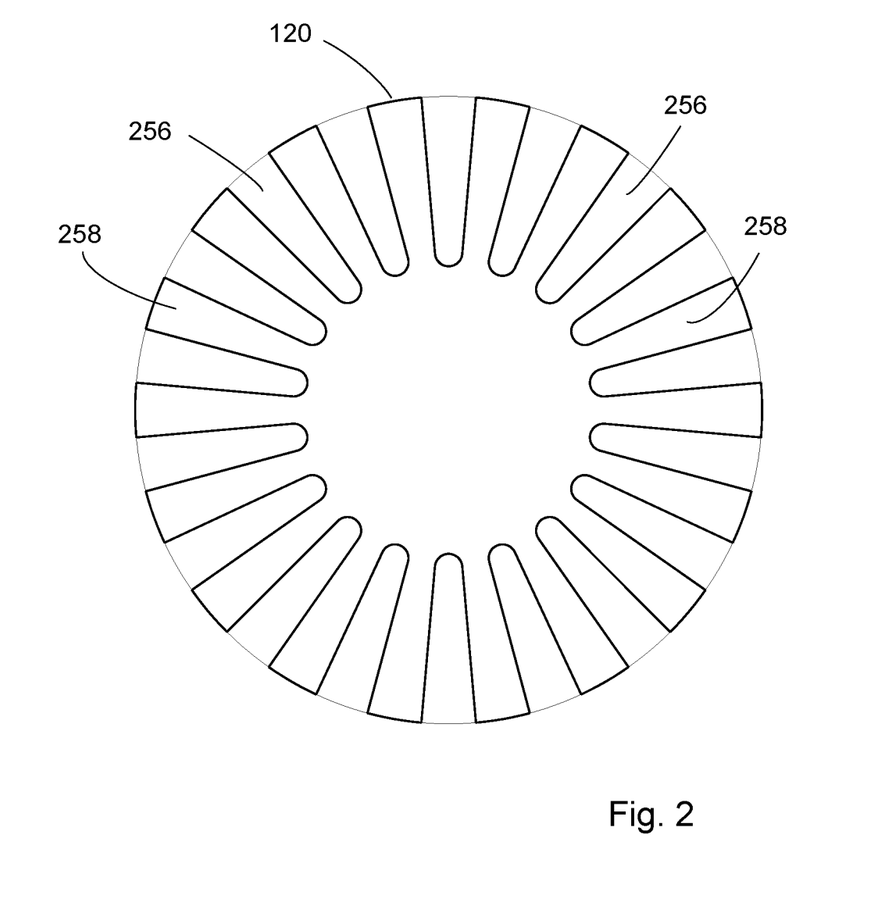
FIG. 2 illustrates a plan view of a variant of a rotor plate incorporating radially oriented grooves.

FIG. 2 illustrates a plan view variant of the rotor plate 120 incorporating radially oriented grooves 256 defined with sidewalls 258.

The radially oriented grooves 256 are not limited to a placement only at the upper surface 122 other options can include radially oriented grooves 256 to be placed at the lower surface 124 or at both upper surface 122 and lower surface 124.

The grooves 256 profile characteristics will determine the extent of the fluid flow momentum imparted into the fluids, gas and liquid, and the degree of fluid shear.

Figure 3:
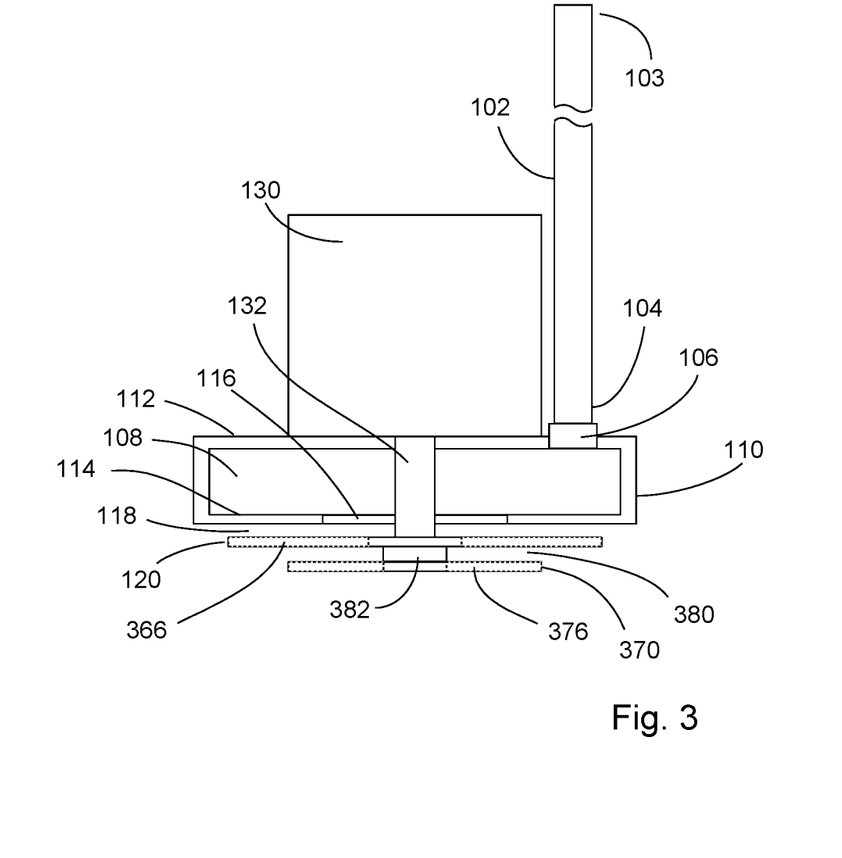
FIG. 3 is a sectional view of rotary gas bubble ejector assembly illustrating an embodiment incorporating multiple rotor plates that include openings with an upper rotor plate having a larger diameter than the lower rotor plate.

FIG. 3 illustrates rotary gas bubble ejector assembly that incorporates similar elements as previously described, such as a fluid reservoir chamber 108 having a fluid intake opening 106 in connection with outlet section 104 of fluid conveyance conduit 102. A bottom end 114 of fluid reservoir chamber 108 has a centrally positioned fluid discharge opening 116. The upper surface 122 of rotor plate 120 is positioned below and in close proximity to bottom end 114 so as to form a fluid acceleration gap 118.

The difference with respect to this embodiment of rotary gas bubble ejector is the provision of multiple rotor plates, which includes an upper rotor plate 120 and a lower rotor plate 370. A shaft 132 extends through gas reservoir chamber 108 and connects to the multiple rotor plates (120, 370).

Upper rotor plate 120 includes openings 366. Lower rotor plate 370 also includes openings 376 and is positioned proximate the upper rotor plate 120 wherein an annular space 380 is created that can be adjusted with a rotor plate spacer 382. The lower rotor plate 370 for this embodiment has a smaller diameter than the upper rotor plate 120.

Bottom end 114 of fluid reservoir chamber 108 incorporates a centrally positioned fluid discharge opening 116 that has a smaller cross-sectional dimension than that of the cross-sectional dimension of upper rotor plate 120. Illustrated in this embodiment the bottom end 114 has an outer perimeter dimension greater than that of the outer distal perimeter dimension of upper rotor plate 120.

When the rotor plates 120 and 370 are in rotation multiple low-pressure zones are generated as the fluid flow velocity gradients change while flowing through fluid acceleration gap 118 and through annular space 380 creating an area of high shear and fluid flow oscillation wherein a two-phase fluid, gas and liquid, flow into and out of the annular space 380. Spacing of the annular space 380 can be adjusted by varying the thickness of rotor plate spacer 382, which allows for the ability to control fluid velocity thereby the shear intensity and the volumetric flow of fluids flowing through annular space 380.

This embodiment produces a high volumetric ratio of micro-sized gas bubbles within the range of 0.1 millimetres (0.0039 inch) and smaller thereby increasing gas transfer or gas dissolution along with an increase in aeration efficiency.

Figure 4:
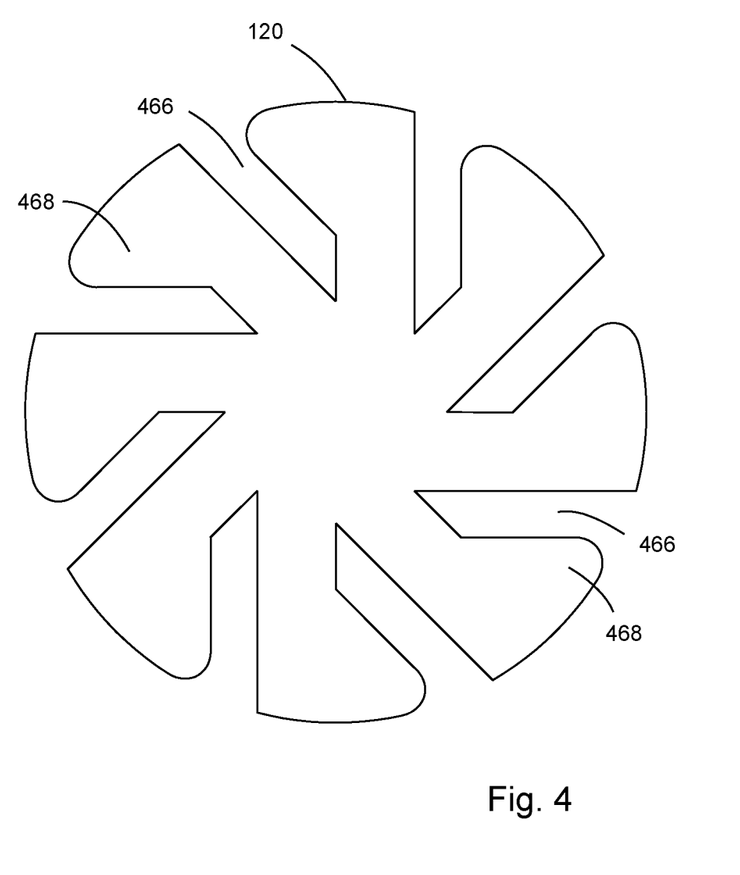
FIG. 4 illustrates a plan view of another variant of rotor plate having slotted openings oriented to forms triangular shaped tabs.

FIG. 4 illustrates a variant of rotor plate 120 that incorporate slotted openings 466 that radiate outwardly towards the perimeter in an orientation that produces a profile that, as viewed from a plan view, having triangular shaped tabs 468.

Tabs 468 can be parallel to or bent at an upward angle, downward angle or combination of flat and angled from upper and bottom surfaces 122 and 124. The pitch degree or angle of the tabs 468 will determine the mixing and shearing rate of the fluids and can be customized based on the application. The greater the tab angle the greater the power requirement, a tab angle of 15 degrees or less has proven to provide adequate shearing activity with less liquid pumping volume providing for reduced power consumption. The rotor plate 120 can rotate clockwise or counterclockwise.

Test along with underwater videos have revealed that this variant of rotor plate 120 with the inclusion of slotted openings 466 and tabs 468 bent downward at 10 degrees generates high fluid shear along with centripetal force wherein a portion of the gas bubbles initially produced are drawn back towards the centre of rotor plate and brought under the affect again of the high shear forces thereby supporting the increased production of micro and smaller sized gas bubbles.

Figure 5:
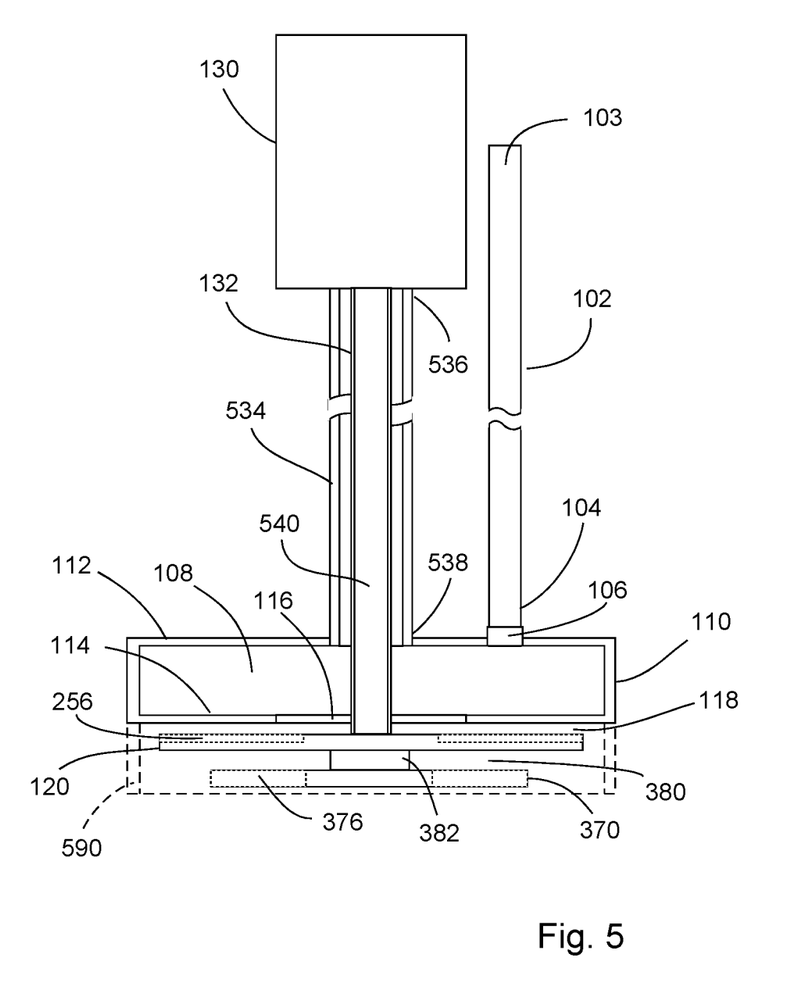
FIG. 5 is a sectional view of the rotary gas bubble ejector assembly illustrating an embodiment that includes a shaft positioned within a sleeve in connection with a fluid reservoir chamber. Also illustrated with dotted lines is an optional fluid deflection skirt attached to fluid reservoir chamber.

FIG. 5 illustrates a rotary gas bubble ejector assembly variant that includes similar elements as previously illustrate and described. The difference in this embodiment is the placement of shaft 132 within sleeve 534 having an upper section 536 in communication with a rotational drive 130 and a lower section 538 having an attachment with upper end 112 of fluid reservoir chamber 108.

Shaft 132 which passes through upper end 112 extends through fluid reservoir chamber 108 and is in connection with the multiple rotor plates 120 and 370 wherein upper rotor plate 120 include grooves 256 and lower rotor plate 370 incorporate openings 376 separated with a rotor plate spacer 382.

In operational mode the rotation of upper rotor plate 120 having grooves 256 will increase the volume and momentum of the fluid (gas) discharged from the fluid acceleration gap 118 and rotation of the lower rotor plate 370 with openings 376 provides for an increase in the volumetric rate of fluid flowing through annular space 380 that will come into contact with gas flowing out from fluid acceleration gap 118 thereby increasing shear. The spacing distance of annular space 380 between upper rotor plate 120 and lower rotor plate 370 can be adjusted by varying the thickness of rotor plate spacer 382.

The rotational drive 130, for this embodiment, is designed to be outside of a body of liquid and is intended to allow for the option where the capability of acquiring a submersible rotational drive can be limited and where the rotary gas bubble ejector is intended to be applied within relatively shallow bodies of liquid.

An optional fluid deflection skirt 590 can be added to below bottom end 114 of fluid reservoir chamber 108 and can increase the axial direction of the ejected two-phase fluid, gas bubbles and liquid, ejected into the liquid body.

An additional option available is that the shaft 132 can include a hollow cavity 540 and as such can provide an additional conduit for the conveyance of gas.

The mode of operation for the rotary gas bubble ejector is predominantly the same for the various embodiments as described and illustrated. In operational mode a rotational drive is provided for rotation of the shaft in connection with the at least one rotor plate and a fluid conveyance conduit is provided to direct the flow of fluid in the form of a gas, such as atmospheric gas, to be conveyed into fluid reservoir chamber. The gas bubble ejector is submerged into a body of liquid and brought into rotation.

Rotation of the rotor plate provides the force that initiates fluid flow and provides an increase in acceleration rate of the fluid flowing into and out of the fluid acceleration gap thereby generating a low-pressure zone, which allows at the initial start-up liquid to be evacuated out from the partially submerged fluid conveyance conduit and the fully submerged fluid reservoir chamber and displaced with gas.

The acceleration rate of the gas exiting the fluid conveyance conduit decreases when it is introduced into the larger volumetric area of the fluid reservoir chamber thereby causing the pressure to increase. The increased pressure within the fluid reservoir chamber supports fluid flow of gas out through the fluid discharge opening and into the low-pressure zone produced within the fluid acceleration gap. As long as the rotor plate is rotating gas will continue to be accelerated through the fluid acceleration gap and ultimately expelled into the liquid wherein the pressure and density differential of the two-phase fluids, gas and liquid, will produce gas bubbles within the micro-size and smaller diameter range.

The spacing of the fluid acceleration gap between bottom end of fluid reservoir chamber and the upper surface of rotor plate is the area or zone of low-pressure generation. The action of the rotating rotor plate imparts a force upon the fluid thereby initiating fluid flow velocity. The spacing distance, along with the rotor plate design, will determine the displacement and acceleration rate. Test have revealed that a spacing of 6.35 mm (0.25 inch) with the use of a solid rotor plate provides an acceleration rate the can displace the fluid radially and maintain a positive flow of fluid, in the form of a gas, out from the fluid acceleration gap. The spacing distance can be increased when rotor plate includes grooves and or openings since there is an increase force applied to the fluid. When rotor plate is not of a solid type the spacing can be increased to 25.4 mm (1 inch) and perform. Added factors for maintaining outward radial fluid flow are related to diameter and angular velocity (RPM) of the rotor plate.

Another way of expressing and viewing the rotary gas bubble ejector is that the area above the upper surface of the rotor plate proximate bottom end of fluid reservoir chamber and within the fluid acceleration gap is a single-phase fluid consisting of gas and at the interface proximate to the gas ejection area of the rotor plate is a two-phase fluid consisting of gas and liquid. Once the gas bubbles are formed and ejected out into a body of liquid a dispersed two-phase fluid flow is generated. It can also be described as three-phase flow since when gas bubbles are within the low to submicron diameters they can act as colloidal particles.

Since the rotary gas bubble ejector is submerged it is important that any connection with the fluid reservoir chamber be sealed so as to prevent infiltration of liquid thereby maintaining a gas volume within fluid reservoir chamber after the liquid has been displaced with gas flowing into the fluid reservoir chamber via fluid conveyance outlet section. This will provide proper operation of the gas bubble ejector. Test have shown that some infiltration does not stop gas bubble production however it can reduce aeration efficiency.

The function of the rotor plate is to provide the force that governs the volumetric flow and the acceleration rate of the fluids, gas and liquid, which also relates to the fluids momentum. As mentioned the acceleration rate and pressure can vary along the fluid flow path, as is the case with the fluid flowing through the fluid conveyance conduit into the fluid reservoir chamber and the radial fluid displacement within the fluid acceleration gap. Changes in the design of the rotor plate will affect the acceleration rate and the pressure of the fluids as they are induced to flow under the influence of the rotor plate.

Gas is a compressible fluid having a lower density than liquid. Liquid is essentially a non-compressible fluid. These different properties contribute to bubble generation and size. As gas is ejected from the fluid acceleration gap it is met with resistance from the liquid, which will imposes a shear stress upon the gas. The type of rotor plate employed will provide an affect within the two-phase fluid zone of interaction such that greater gas flow momentum will react against the resistance force and develop pressure plus density variations, which can provide additional fluid shear, the formation of vortices and increased turbulence along with mixing.

Test trials along with underwater videos of full-scale prototypes have demonstrated that all rotor plate design variants have performed the objective of micro-sized gas bubble production. After a number of field trials and full scale manufacturing of components it has been determined that the rotor plate incorporating grooves or openings having a slotted design with tabs as illustrated in FIG. 3 is a one preferred variant within wastewater treatment aeration applications where high oxygen transfer is beneficial.

An aeration efficiency comparison test was performed utilizing a 2.8 amp, 240-volt 0.745 Kilowatts (one horsepower) submersible rotational drive motor at 60 hertz and 1450 RPM in connection with two different types of rotor plate variants each submerged to a depth of one meter (39 inches) with a fluid acceleration gap of 6.35 millimetres (0.25 inch); 'Type 1'—a single 12.7 millimetre (0.5-inch) thick by 152 millimetres (6-inch) diameter rotor plate having 12.7 millimetres (0.5-inch) wide outward radiating grooves and; 'Type 2'—multiple rotor plates employing an upper and a lower rotor plate, wherein the upper rotor plate is identical to 'type 1' in combination with a 127 millimetre (5-inch) diameter lower rotor plate equipped with 12.7 millimetres (0.5 inch) slotted openings having tabs angled downward at 10-degrees and separated with a rotor plate spacer of 6.35 millimetres (0.25-inch). The outcome of the test revealed that 'Type 1' operated at 2.5 amps and transferred less oxygen within a one hour time frame than that of 'Type 2', which required a slightly greater current draw of 3 amps however the aeration efficiency resulted in being close to equal for both rotor plate types after measuring the volume of oxygen transferred over the one hour time frame coupled with the current draw input.

Test also revealed that the multiple rotor plate variant having a 152 millimetres (6-inch) diameter upper rotor plate with slotted openings incorporating flat tabs and two additional lower 127 millimetres (5-inch) rotor plates separated with an annular spacing of 6.35 millimetres (0.25-inch) and each equipped with slotted openings incorporating tabs bent at an angle of 10 degrees downward from the rotor plate face provided greater velocity and pressure gradients along with the production of fluid oscillations, the formation of vortices and a greater volumetric ratio of micro-sized gas bubble within the range of 0.1 millimetres and smaller. This can have benefits within wastewater treatment that require a large volume of oxygen transfer in order to provide for the oxygen needs of aerobic microorganisms as they multiply and consume the soluble food and the oxygen. When high percentage of food, most especially high carbohydrate type of food, is available oxygen can become the limiting factor for ensuring adequate growth of the microorganisms thereby limiting the treatment efficiency.

As previously mentioned addition of openings, grooves and or tabs to the rotor plate (or multiple rotor plates), increases the energy flow of the fluids, which can be beneficial in some applications while in other applications such as aquaculture where living aquatic species can be negatively affected by the increase energetic fluid flows. In these situations the use of less aggressive fluid flow by employing rotor plate variants that minimize potential negative physical impacts to the aquatic inhabitants while still providing adequate oxygen transfer input for supporting aquatic biological respiration.

These unique features of the rotary gas bubble ejector provides for the production of micro-sized gas bubbles of various diameters that allow high rate of oxygen transfer (and, or other gases) into a body of liquid by increasing the interfacial surface area contact of the gas bubbles with the liquid. Internal gas pressure increases as bubble diameter decreases below 0.085 millimetres (0.0033 inch) thereby increasing the active driving force of the gas within the bubble to transfer out into the liquid. Micro-sized gas bubbles prevent gas bubble coalescence as well as reduce the gas bubble rise velocity thereby increasing bubble residence time allowing for greater gas dissolution. These features provided by the rotary gas bubble ejector can therefore support higher aeration efficiency.

The rotor plate can be adapted to meet various needs and application by modifying its design from a solid surface form to including grooves, openings as well as incorporating multiple rotor plates of equal or different diameters and combined configurations. The inherent design flexibility of the rotary gas bubble ejector enables greater customizable options related to the specificity of various applications along with an ability to maximize efficiencies.

The simplicity of construction, installation, maintenance, design flexibility and application adaptability of the rotary gas bubble ejector as described and illustrated is believed to support an increase in aeration efficiency and a potential to reduce associative life cycle cost.

In contrast, the referenced self-aspirating type prior art aeration devices are less adaptive or customizable and for most require a rotatable aeration component (impeller, propeller, disc) to be positioned within a housing, gas-liquid mixture chamber, decompression chamber or other form of enclosure. They most typically produce a greater volume of millimetre sized gas bubbles, which can increase coalescence thereby forming larger gas bubble that will have a greater rise velocity, which can lower the oxygen transfer potential especially when positioned at shallow depths. Greater horsepower is required as the depth of the aeration component increases thereby reducing aeration efficiency.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:
1. Rotary gas bubble ejector, comprising:
a fluid reservoir chamber (108) has a volume defined by a sidewall (110), an upper end (112) and a bottom end (114), the fluid reservoir chamber (108) having a single-phase fluid intake opening (106) for an intake of gas from a gas source into the fluid reservoir chamber (108) and a fluid discharge opening (116) positioned at the bottom end (114) of the fluid reservoir chamber (108) whereby gas exits the fluid reservoir chamber;
multiple rotor plates (120, 370) that includes an upper rotor plate (120) with an upper surface (122) and a lower surface (124), and at the least one lower rotor plate (370) having openings (366) that transect through an upper surface (122), to a lower surface (124) the upper rotor plate (120) having a cross sectional dimension that is greater than the fluid discharge opening (116);
a fluid acceleration gap (118) positioned between the bottom end (114) of the fluid reservoir chamber (108) and the upper surface (122) of the upper rotor plate (120); and
a shaft (132) that extends through the fluid reservoir chamber (108) is in connection with the multiple rotor plates (120, 370), such that upon rotation of the shaft (132), a fluid flow is initiated by the multiple rotor plates (120, 370) thereby producing a low-pressure zone that draws a single-phase fluid in the form of gas from the fluid discharge opening (116) at the bottom end (114) of the fluid reservoir chamber (108) through the fluid acceleration gap (118).

2. The rotary gas bubble ejector of claim 1, wherein the upper rotor plate (120) includes grooves (256) placed on the upper surface (122).

3. The rotary gas bubble ejector of claim 1, wherein the upper rotor plate (120) includes grooves (256) placed on the lower surface (124).

4. The rotary gas bubble ejector of claim 1, wherein the upper rotor plate (120) includes openings (366) that transect the upper surface and the lower surface (122, 124).

5. The rotary gas bubble ejector of claim 4, wherein the openings (366) of the upper rotor plate (120) are slotted shaped openings (466) that include tabs (468).

6. The rotary gas bubble ejector of claim 1, wherein the openings (366) of the at least one lower rotor plate (370) are slotted shaped openings (466) that include tabs (468).

7. The rotary gas bubble ejector of claim 5, wherein the tabs (468) are angled away from the upper surface (122) and the lower surface (124).

8. The rotary gas bubble ejector of claim 1, wherein the shaft (132) is rotated with a rotational drive (130) that is submersible.

9. The rotary gas bubble ejector of claim 1, wherein the shaft (132) is positioned within a sleeve (534) having a lower section (538) in attachment with the upper end (112) of the fluid reservoir chamber (108).

10. The rotary gas bubble ejector of claim 1, wherein the shaft (132) includes a hollow cavity (540).

11. The rotary gas bubble ejector of claim 1, wherein the bottom end (114) of fluid reservoir chamber (108) includes the addition of a fluid deflection skirt (590).

* * * * *